United States Patent
Olesen et al.

(10) Patent No.: US 9,827,912 B2
(45) Date of Patent: Nov. 28, 2017

(54) TIGHT BEZEL TO GLASS FIT MIRROR ASSEMBLY

(71) Applicant: Gentex Corporation, Zeeland, MI (US)

(72) Inventors: Niels A. Olesen, Zeeland, MI (US);
William L. Tonar, Holland, MI (US);
Joel A. Stray, Hudsonville, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 15/204,105

(22) Filed: Jul. 7, 2016

(65) Prior Publication Data

US 2017/0008458 A1    Jan. 12, 2017

Related U.S. Application Data

(60) Provisional application No. 62/189,302, filed on Jul. 7, 2015.

(51) Int. Cl.
*G02F 1/153* (2006.01)
*B60R 1/08* (2006.01)
*B60R 1/04* (2006.01)

(52) U.S. Cl.
CPC ............... *B60R 1/088* (2013.01); *B60R 1/04* (2013.01)

(58) Field of Classification Search
CPC ............................ B60R 1/088; G02F 1/1533
USPC .......................................................... 359/267
See application file for complete search history.

(56) References Cited

U.S. PATENT DOCUMENTS

| 7,064,882 B2 | 6/2006 | Tonar |
| 7,978,393 B2 | 7/2011 | Tonar et al. |
| 8,491,137 B2 | 7/2013 | Lynam et al. |

*Primary Examiner* — Jack Dinh
(74) *Attorney, Agent, or Firm* — Price Heneveld LLP; Bradley D. Johnson

(57) ABSTRACT

A rearview mirror assembly includes a housing, a bezel, and an electro-optic mirror element. The electro-optic mirror element includes a first substantially transparent substrate having an edge extending around at least a portion of a perimeter of the first substantially transparent substrate and a second substantially transparent substrate. The first and second substantially transparent substrates define a cavity. An electro-optic material is disposed within the cavity. The first substantially transparent substrate and at least one of the housing and bezel have a difference in coefficient of thermal expansion between about 5 ppm and about 50 ppm.

20 Claims, 4 Drawing Sheets

TIGHT BEZEL TO GLASS FIT MIRROR ASSEMBLY

CROSS-REFERENCE TO RELATED APPLICATIONS

This application claims the benefit of and priority to U.S. Provisional Patent Application No. 62/189,302, filed on Jul. 7, 2015, entitled "TIGHT BEZEL TO GLASS FIT MIRROR ASSEMBLY," the entire disclosure of which is hereby incorporated herein by reference.

FIELD OF THE DISCLOSURE

The present disclosure generally relates to a rearview mirror assembly, and more particularly, a rearview mirror assembly having a tight bezel to glass fit.

BACKGROUND OF THE DISCLOSURE

In many mirror products today, a very uniform fit between an edge of a glass shape and a surrounding flush mounted bezel or housing is desired to produce an aesthetically pleasing product. A large or non-uniform gap between the glass edge and the bezel or housing is unsightly. A uniform gap produces a smooth, pleasing, seamless transition between the bezel or housing and the mirror element. Lack of uniformity in the gap of traditional mirror products may be attributed to conventional cutting techniques including scribe and break, abrasive wheel, and water jet cutting techniques. Large gaps may be present between bezels and/or housings and the glass of the mirror products to prevent the accumulation of stress in the glass as the mirror product undergoes a change in thermal conditions such as a change in size due to thermal expansion or contraction. The gaps may provide a space for the mirror glass, bezel and/or housing with different thermal expansion coefficients to expand and contract into without causing damage to the glass.

SUMMARY OF THE PRESENT DISCLOSURE

According to one aspect of this disclosure, a rearview mirror assembly includes a housing, a bezel, and an electro-optic mirror element. The electro-optic mirror element includes a first substantially transparent substrate having an edge extending around at least a portion of a perimeter of the first substantially transparent substrate and a second substantially transparent substrate. The first and second substantially transparent substrates define a cavity. An electro-optic material is disposed within the cavity. The first substantially transparent substrate and at least one of the housing and bezel have a difference in coefficient of thermal expansion between about 5 ppm and about 50 ppm.

According to another aspect of this disclosure, a rearview mirror assembly including a housing, a bezel and an electro-optic mirror element. The electro-optic mirror element includes a first substantially transparent substrate, and a second substantially transparent substrate. The first and second substantially transparent substrates define a cavity. An electro-optic material is disposed within the cavity. A gap is defined between the electro-optic element and the bezel, the gap having a width of less than about 25 μm around at least about 75% of the electro-optic element.

According to another aspect of this disclosure, a rearview mirror assembly including a housing, a bezel and an electro-optic element. The electro-optic element includes a first substantially transparent substrate having an edge extending around at least a portion of a perimeter of the first substantially transparent substrate and a second substantially transparent substrate. The first and second substantially transparent substrates define a cavity. An electro-optic material is disposed within the cavity. At least one of the bezel and the housing includes a polymeric material having a coefficient of thermal expansion less than about 50 ppm.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION OF EMBODIMENTS

Figure 1A:
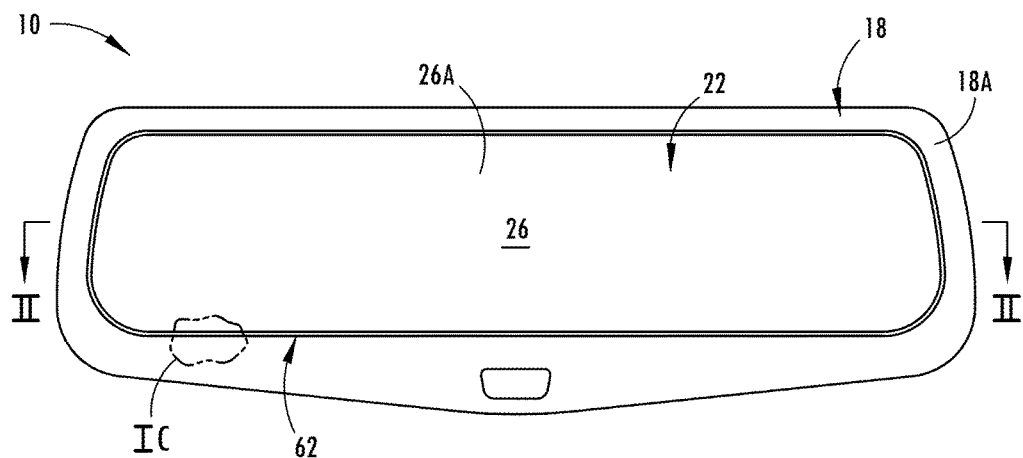
FIG. 1A is a front view of a rearview mirror assembly of the present disclosure.

The present illustrated embodiments reside primarily in combinations of method steps and apparatus components related to aircraft window assemblies. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1A-3B, reference numeral 10 generally designates a rearview mirror assembly. The review mirror assembly 10 includes a housing 14 and a bezel 18. The bezel 18 defines a bezel first surface 18A. Positioned within the rearview mirror assembly 10 is an electro-optic element 22. The electro-optic element 22 may be a mirror element. The electro-optic element 22 has a first substantially transparent substrate 26 having a first surface 26A and an edge 30 extending around at least a portion of a perimeter of the first substantially transparent substrate 26. The electro-optic element 22 also includes a second substantially transparent substrate 34. The first and second substantially transparent substrates 26, 34 define a cavity 38 in which an electro-optic material 42 is disposed. The edge 30 of the first substantially transparent substrate 26 and at least one of the housing 14 and bezel 18 have a substantially line-to-line fit.

Figure 1B:
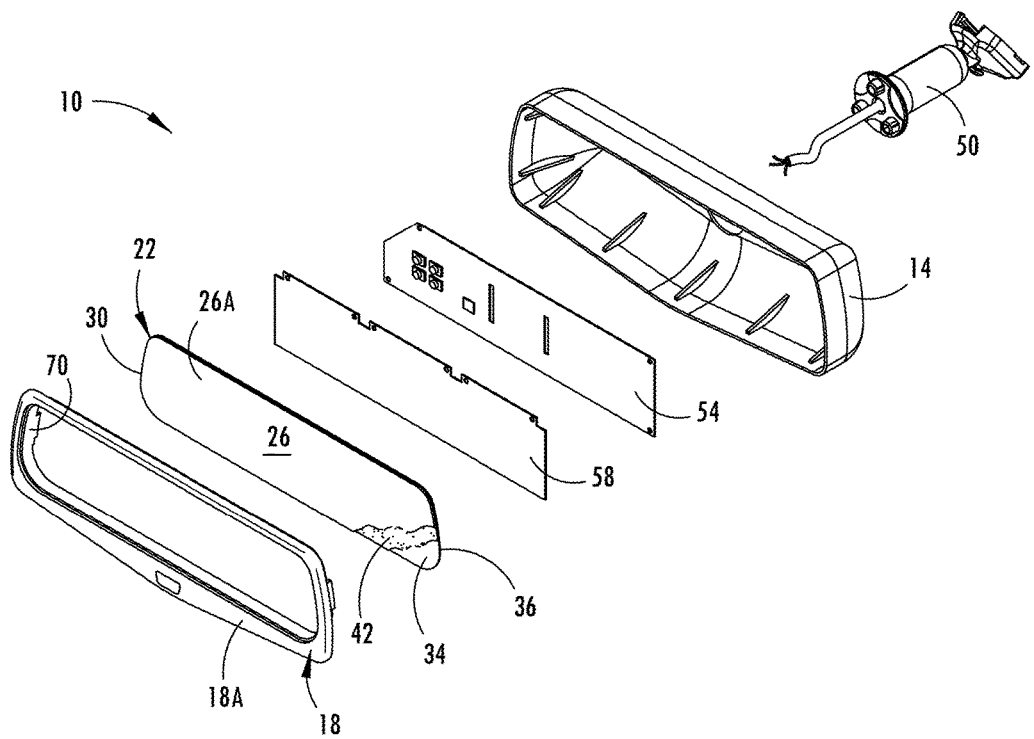
FIG. 1B is a top perspective exploded view of the rearview mirror assembly of FIG. 1A.

With reference now to the depicted embodiment of FIGS. 1A and 1B, the illustrated rearview mirror assembly 10 can be an interior rearview assembly positioned within an interior of a vehicle. When the rearview mirror assembly 10 is an interior rearview assembly, the rearview mirror assembly 10 may be connected to a mount 50, which is adapted to be mounted inside the vehicle in a location proximate to or on a front windshield of the vehicle. It should be noted that the present disclosure is equally applicable to exterior mirrors, as well as other optical assemblies positioned within bezels and housings. The first substrate 26 may include a variety of transparent materials transparent in the visible region of the electromagnetic spectrum including soda-lime float glass, EAGLE® glass, alkaline earth boro-aluminosilacate glass, GORILLA° glass, alkali-aluminosilicate glass, chemically strengthened glass, insulated glass, tempered glass, sapphire, optical crystals, diamond, quartz, ceramics, polymers or plastics. The second substrate 34 may include the same materials as the first substrate 26, but does not need to be transparent and therefore may include polymers, metals, glass, ceramics, and/or composites. Similarly to the first substrate 26, the second substrate 34 defines a second edge 36. The first and second substrates 26, 34 may have a thickness between about 0.1 mm to about 3.0 mm, between about 0.5 mm to about 2.2 mm, or between about 0.8 mm to about 1.6 mm. In some embodiments, the thicknesses of the first and second substrates 26, 34 may differ from one another. Furthermore, a reflector material may be located on either a front surface or a rear surface of the second substrate 34, depending upon the type of electro-optic element 22. The first and second substrates 26, 34 may have a coefficient of thermal expansion of between about 3 ppm and about 15 ppm, or less than about 20 ppm, 15 ppm, 14 ppm, 13ppm, 12 ppm, 11 ppm, 10 ppm, 9 ppm, 8 ppm 7 ppm, 6 ppm, 5 ppm, 4 ppm or less than about 3 ppm.

The rearview mirror assembly 10 also includes a circuit board 54 and a carrier plate 58. The carrier plate 58 can be located behind the electro-optic element 22 and have the circuit board 54 connected thereto. If the rearview mirror assembly 10 is an interior rearview assembly, the carrier plate 58 is typically fixed in position within the housing 14. The carrier plate 58 of the rearview mirror assembly 10 can be used to maintain the position of the electro-optic element 22 and/or carry the circuit board 54. An example of an interior rearview assembly including a carrier plate and a circuit board is disclosed in U.S. Pat. No. 6,239,899, entitled "MIRROR WITH INTERNAL SUPPORT PLATE," assigned to Gentex Corporation, the entirety of which is hereby incorporated herein by reference. In the rearview mirror assembly 10, the carrier plate 58 assists in maintaining the electro-optic element 22 in position within the housing 14. An example of the housing 14, bezel 18, carrier plate 58, circuit board 54 and their interconnections may be found in U.S. Patent Application Publication No. 2005/0152054 entitled "REFLECTIVE ELEMENT HOLDER FOR REARVIEW MIRROR," assigned to Gentex Corporation, the entirety of which is hereby incorporated herein by reference. However, it is contemplated that the rearview mirror assembly 10 could have a bezel, circuit board 54 and/or carrier plate 58 omitted from the rearview mirror assembly 10.

The illustrated electro-optic element 22 has the electro-optic material 42 positioned between the first substrate 26 and the second substrate 34. In some embodiments, the electro-optic material 42 may be an electrochromic material. In such embodiments, the electro-optic material 42 may be a solution phase as disclosed in U.S. Pat. No. 4,902,108 entitled "SINGLE-COMPARTMENT, SELF-ERASING, SOLUTION-PHASE ELECTROCHROMIC DEVICES, SOLUTIONS FOR USE THEREIN, AND USES THEREOF" and U.S. Pat. No. 5,278,693 entitled "TINTED SOLUTION-PHASE ELECTROCHROMIC MIRRORS," commonly assigned to Gentex Corporation, both of which are hereby incorporated in their entirety herein. In other embodiments, the electro-optic material 42 may be in a solid-state. In addition, a hybrid system where part of the electro-optic material 42 is solid-state and part is solution phase is also contemplated. Solution-phase materials, because of their liquidic or flowable properties, do not rigidly bond the first and second substrates 26, 34 together like completely solid-state electro-optic material 42. The electro-optic material 42 may have a thickness between about 1 micron and about 1000 microns.

The flexibility of the electro-optic element 22 may be dependent on a variety of factors, including thickness of the first and second substrates 26, 34, type (e.g., solution-phase or solid-state) of electro-optic material 42, and overall thickness of the electro-optic element 22. For example, in embodiments of the rearview mirror assembly 10 having solid-state electro-optic material 42, the first and second substrates 26, 34 are bonded together in a manner that causes them to bend much like a piece having their total thickness. Contrastingly, electro-optic elements 22 having a solution-phase electro-optic material 42 bend in a complex manner wherein the first and second substrates 26, 34 bend simultaneously, but independently. Additionally, the solution phase electro-optic material 42 may ebb and flow somewhat in reaction to the stress. The net result is that the electro-optic element 22, in embodiments with solution phase electro-optic material 42, tends to be more flexible than electro-optic elements 22 with solid-state phase electro-optic material 42, even where the first and second substrates 26, 34 have the same thickness and other properties.

The first and second substrates 26, 34 may be cut to shape in a variety of processes. In one embodiment, the first and second substrates 26, 34 are cut to shape with the use of a score and break technique. In another embodiment, an abrasive wheel or a high pressure water jet may be used to cut the first and second substrates 26, 34. In yet another embodiment, the first and second substrates 26, 34 may be cut using a laser. Examples of laser systems and laser cutting are described in U.S. Pat. No. 8,842,358, entitled "APPARATUS, METHOD, AND PROCESS WITH LASER INDUCED CHANNEL EDGE" and U.S. Patent Application Publication No. 2014/0034616, entitled "LASER SYSTEM AND METHOD THEREOF," each of which is assigned to Gentex Corporation and is hereby incorporated herein by reference in its entirety. The roughness of the edge and second edge 30, 36 cut via a laser cutting process can have an Rq value of less than approximately 1.6, an Rq value of less than approximately 1.5, an Rq value of less than approximately 1.3, an Rq value of less than approximately 1.2, an Rq value ranging from and including approximately 0.9 to approximately 1.6, an Rq value ranging from and including approximately 1.0 to approximately 1.5, an Rq value ranging from and including approximately 1.1 to approximately 1.4, an Rq value of approximately 1.16, or a combination thereof.

Figure 1C:
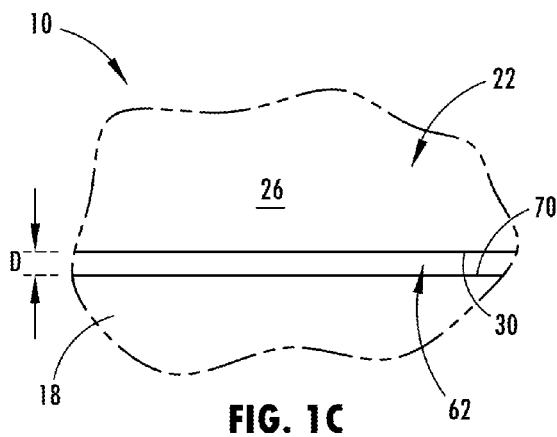
FIG. 1C is an enlarged front view of the rearview mirror assembly of FIG. 1A taken at IC.

Referring now to FIG. 1C, in assembly, the bezel 18 and the edge 30 of the first substrate 26 are capable of having a line-to-line fit, or a very tight fit. A gap 62 is defined in the rearview mirror assembly 10 between the bezel 18 and the electro-optic element 22. The gap 62 extends a distance D between an inner surface 70 of the bezel 18 and the edge 30 of the first substrate 26 or the second edge 36 of the second substrate 34. The distance D may be equal to or less than about 0.5 mm, than about 0.4 mm, than about 0.3 mm, than about 0.2 mm, than about 100 μm, 50 μm, or less than about 25 μm when measured at about 25° C. In embodiments not utilizing the bezel 18, the gap 62 between the housing 14 and the edge or second edge 30, 36 may have the same or similar distance D as the bezel 18 and the edge and second edge 30, 36. The gap 62 may have a substantially uniform distance D around the electro-optic element 22. According to various examples, the gap 62, having any of the widths D disclosed above may extend around greater than about 70%, 75%, 80%, 85%, 90%, 95% or greater than 99% of the electro-optic element 22 (e.g., the edge 30 and the second edge 36).

The gap 62 may have a sufficiently small distance D so as not to be noticeable by an observer at a typical distance (e.g., a distance from a driver or passenger's head to the rearview mirror assembly 10). It should be understood that embodiments of the rearview mirror assembly 10 not including a bezel 18 may still have a line-to-line fit with the housing 14 and that the gap 62 may alternatively be defined between the edge 30 or second edge 36 and the housing 14.

Figure 1D:
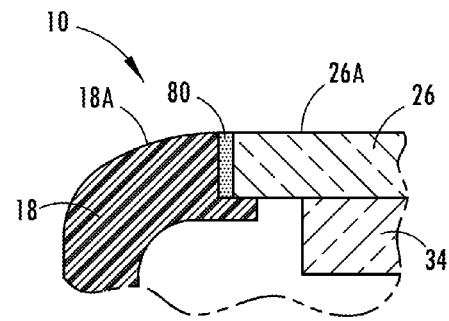
FIG. 1D is an illustration of a cross sectional view of the rearview mirror assembly according to one embodiment taken at line II of FIG. 1A.

Referring now to FIG. 1D, in various embodiments, a filler 80 may be disposed within the gap 62. The filler 80 may fill the gap 62 such that the filler 80 is flush or substantially flush with the first surface 26A of the first substrate 26 and the bezel first surface 18A of the bezel 18. The filler 80 may be an adhesive, resin, acrylate, methacrylate, urethane, epoxy, silicone, polysulfide and/or polyolefin. The filler 80 may be a thermoplastic, a thermoset or cured by ultraviolet light or moisture. In assembly, the filler 80 is configured to fill in the gap 62 such that it is not noticeable by an observer at typical viewing distances of the rearview mirror assembly 10. In embodiments where the filler 80 is flexible (e.g., a silicone or urethane elastomer), the filler 80 may aid in stress reduction within the rearview mirror assembly 10 by flexing to absorb stresses generated (e.g., by thermal changes) within the assembly 10.

Figure 2A:
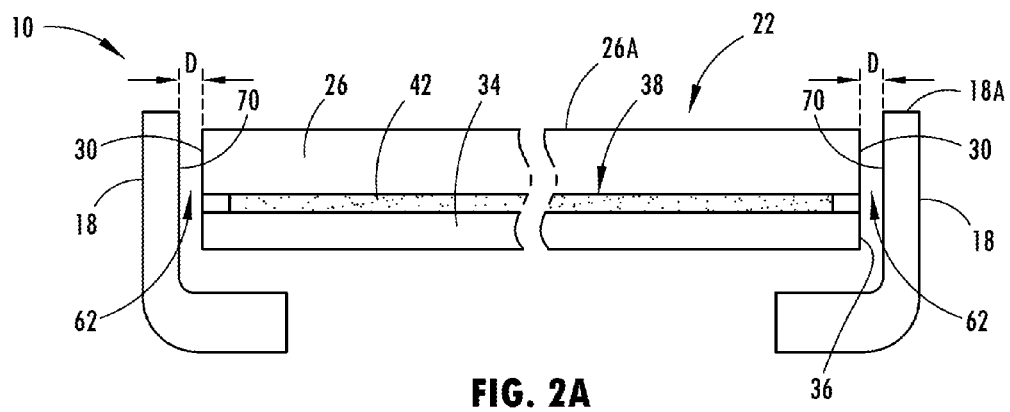
FIG. 2A is an illustration of a cross sectional view of the rearview mirror assembly according to one embodiment taken at line II of FIG. 1A.
Figure 2B:
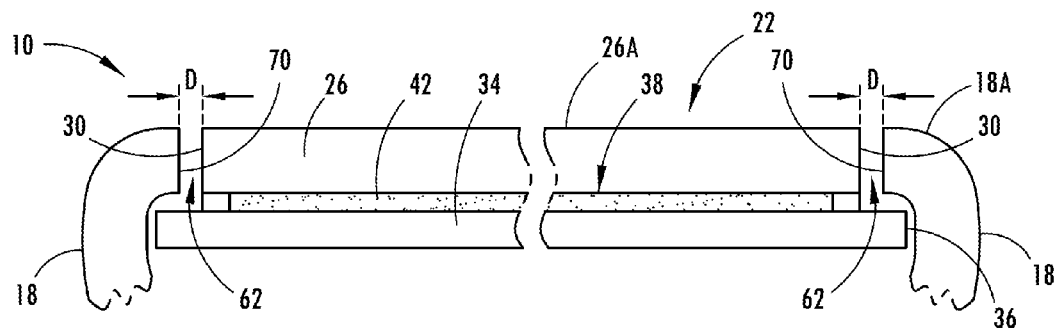
FIG. 2B is an illustration of a cross sectional view of the rearview mirror assembly according to another embodiment taken at line II of FIG. 1A.
Figure 2C:
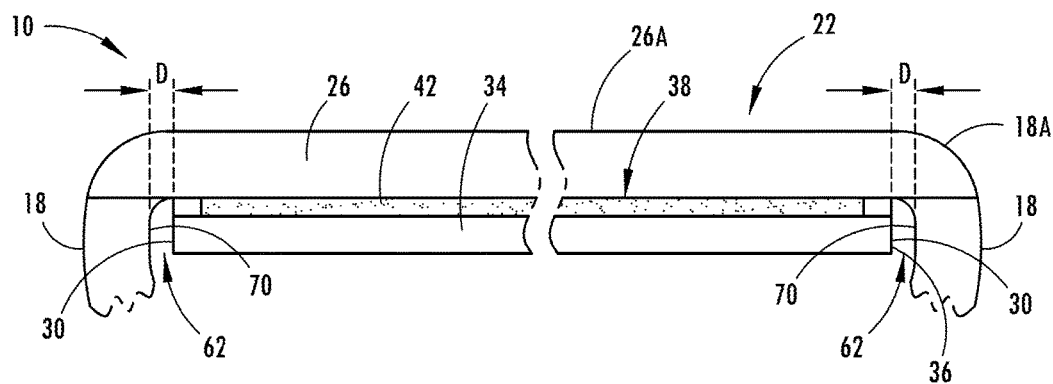
FIG. 2C is an illustration of a cross sectional view of the rearview mirror assembly according to yet another embodiment taken at line II of FIG. 1A.
Figure 2D:
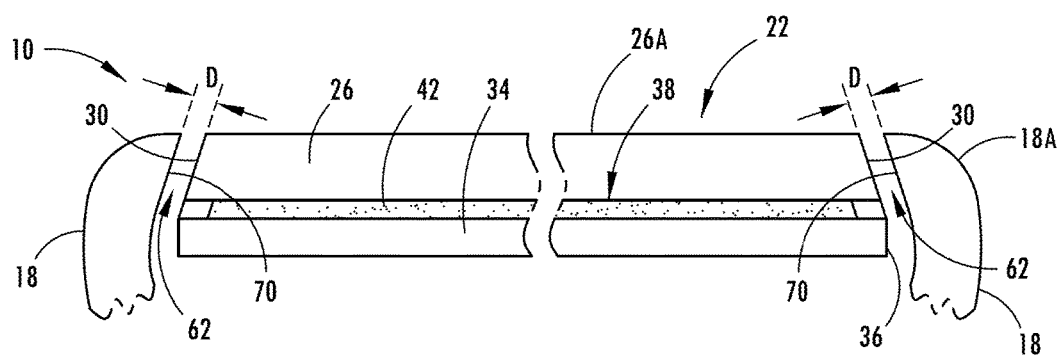
FIG. 2D is an illustration of a cross sectional view of the rearview mirror assembly according to yet another embodiment taken at line II of FIG. 1A.

Referring now to FIGS. 2A-C, the orientation of the bezel 18 relative to the electro-optic element 22 may take a variety of configurations, each defining the gap 62 between the electro-optic element 22 and the bezel 18. The small distances D of the gap 62 may be advantageous for a variety of reasons. For example, in embodiments where there is little or no positional offset between the first and second substrates 26, 34, similar to that depicted in FIG. 2A, the distance D may be small to reduce the visibility of a separation between the first or second substrates 26, 34 of the electro-optic element 22 and the bezel 18 or housing 14 of the rearview assembly 10. A tight fit between the bezel 18 and the electro-optic element 22 may give the appearance of a greater viewing area as well as a decrease in the apparent thickness of the bezel 18. In embodiments of the electro-optic element 22 where there exists a positional offset similar to that depicted in FIG. 2B, the decreased size of the gap 62 between the inner surface 70 of the bezel 18 and the edge 30 of the first substrate 26 allows for a greater size first substrate 26, giving the appearance of a fuller view to the driver of the vehicle. Additionally, a smaller distance D leads to a more continuous appearance between the bezel 18 and the electro-optic element 22 and decreases the visibility of the gap 62 between the bezel 18 and the electro-optic element 22. In embodiments such as depicted in FIG. 2C, it may be advantageous to minimize the distance D of the gap 62 to decrease the size of a chrome ring positioned on a rear, or inner, surface of the first substrate 26. Chrome rings are used to conceal the bezel 18, associated electronics and seals, and the gap 62. Accordingly, by reducing the size of the gap 62, a decrease in size of the chrome ring may be realized which results in a cost savings and increases the perceived viewing area of the rearview mirror assembly 10. In embodiments similar to that depicted in FIG. 2D, the small gap 62 between the bezel 18 and the first substrate 26 allows for a decreased visibility of the separation between the bezel 18 and the electro-optic element 22.

Traditionally, design of a bezel 18 or housing 14 around the electro-optic element 22 takes into account the differences in the coefficient of thermal expansion ("CTE") of the materials used in the electro-optic element 22, as well as the bezel 18 and housing 14. Polymeric materials typically have a greater CTE than glass, ceramic, or metal components. This means that as the temperature of the rearview mirror assembly 10 changes, the different materials of the rearview mirror assembly 10 expand and contract at different rates. The differential expansion of the components of the rearview mirror assembly 10 may result in the generation of stresses within the assembly 10 if not properly accounted for. In the case of automotive applications, typical temperature testing takes place in a range between about −40° C. to about 125° C. Conventional bezels are made out of strong and fairly rigid engineering plastics such as polypropylene, Acrylonitrile butadiene styrene/Polycarbonate, Acrylonitrile Styrene Acrylate, and have thermal expansion coefficients that are much larger than glasses, ceramics, and metals. This expansion difference can create hoop stress as conventional bezels shrink around glass and metal elements at cold temperatures. As a result, conventional bezels may have ribs or large gaps to accommodate the different thermal size changes between bezels/housings and mirrors.

Depending on processing and material parameters, molded parts (e.g., the housing 14 or bezel 18) can vary in size significantly from piece to piece or from run to run. As such, to hold the distance D of gap 62 to a minimum and to maintain consistency in the distance D of the gap 62 from part to part, it may be desirable to post machine the inner surface 70 of the bezel 18 or it may be desirable to measure the inside dimensions of the bezel 18 and then cut edge 30 of the first substrate 26 to match. This process is applicable to both single shot molding operations, including one mold with one cavity size, as well as multi-shot molding operations having multiple molds, each of which can include different cavity sizes.

Figure 3A:
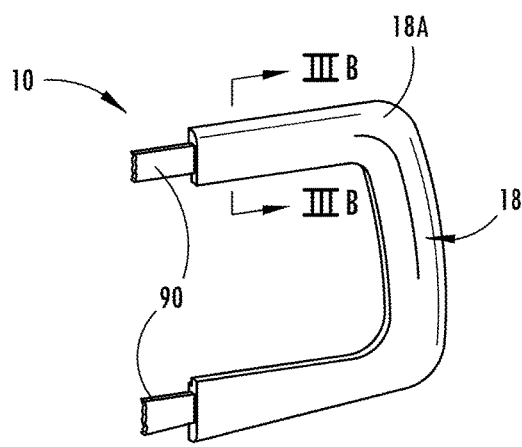
FIG. 3A is a perspective view of the aircraft window in assembly according to one embodiment.
Figure 3B:
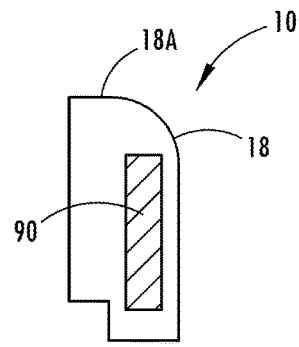
FIG. 3B is a cross sectional view of the rearview mirror assembly according to one embodiment taken at line IIIB of FIG. 3A.
Figure 3C:
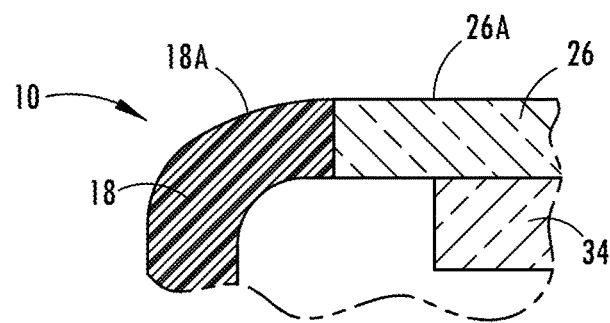
FIG. 3C is an illustration of an enlarged cross sectional view of the rearview mirror assembly according to yet another embodiment taken at line II of FIG. 1A.
Figure 3D:
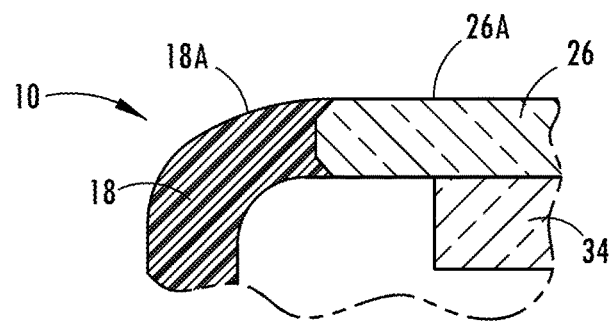
FIG. 3D is an illustration of an enlarged cross sectional view of the rearview mirror assembly according to yet another embodiment taken at line II of FIG. 1A.
Figure 3E:
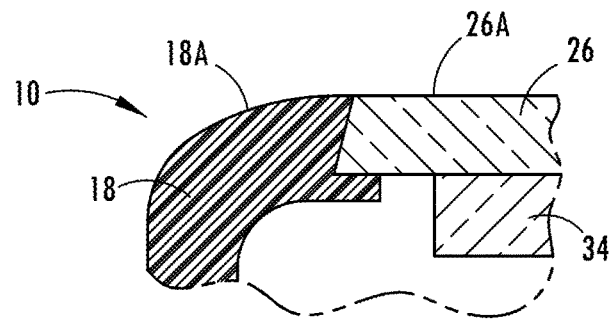
FIG. 3E is an illustration of an enlarged cross sectional view of the rearview mirror assembly according to yet another embodiment taken at line II of FIG. 1A.
Figure 3F:
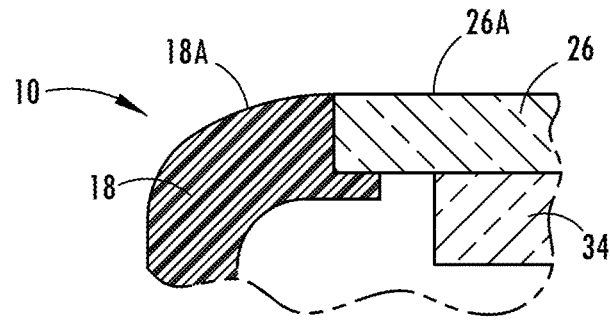
FIG. 3F is an illustration of an enlarged cross sectional view of the rearview mirror assembly according to yet another embodiment taken at line II of FIG. 1A.

Referring now to FIGS. 3A and 3B, the rearview mirror assembly 10 may optionally include a reinforcement 90 positioned within the bezel 18. The reinforcement 90 may be a continuous or discontinuous structure extending through the bezel 18. In continuous embodiments, the reinforcement 90 may form a continuous loop such that the electro-optic element 22 is substantially encircled. In discontinuous embodiments, the reinforcement 90 may include a plurality of portions positioned around the bezel 18. For example, the reinforcement 90 may include two separate portions, each of which extend along a top or bottom of the bezel 18. The reinforcement 90 may have a variety of cross-sectional configurations. For example, the cross-sectional configuration of the reinforcement 90 may include circular, triangular, rectangular, and square configurations and may vary across the reinforcement 90. The reinforcement 90 may comprise a variety of materials, including polymers, metals, ceramics, glasses, and fibers. In polymeric embodiments of the reinforcement 90, the polymer used may be an extremely low CTE polymer, or a composite material having a polymer and a high volume fraction of low CTE filler material. Metallic embodiments of the reinforcement 90 may include metals such as aluminum, steel, stainless steel, Kovar, Invar, molybdenum, titanium, cast iron, zinc, magnesium, and other metals and alloys with a sufficiently low CTE and weight. According to one embodiment, the reinforcement 90 may be insert molded within the material of the bezel 18. It should be understood that embodiments of the rearview mirror assembly 10 not including a bezel 18 may still have the reinforcement positioned within the housing 14. When in use, the reinforcement 90 may dominate the thermal expansion properties of the bezel 18, bringing the effective CTE of the bezel 18 closer to the CTE of the first and/or second substrates 26, 34 to reduce stresses generated due to thermal changes and enable similar distances D for the gap 62. The effective CTE of the bezel 18 incorporating the reinforcement 90 may be less than about 60 ppm, less than about 40 ppm, or less than about 20 ppm.

Additionally or alternatively to the reinforcement 90, the bezel 18 may comprise a polymeric material having a low enough CTE such that temperature changes in the bezel 18 do not cause undue contraction of the bezel 18 around the electro-optic element 22 and result in stress formation. In various embodiments, the CTE of the polymeric material of the bezel 18 and the housing 14 may be less than about 70 ppm, less than about 60 ppm, less than about 50 ppm, less than about 40 ppm, less than about 30 ppm, less than about 25 ppm, and less than about 20 ppm. Exemplary low CTE polymers may include polyetherimides, filled polyetherimides, liquid crystal polymer, filled liquid crystal polymer, nylon, filled nylon, filled polycarbonate, filled acrylonitrile butadiene styrene, polyamide-imide, filled polyamide-imide, filled polyphenylene sulfide, high density polyethylene, polystyrene and other polymers having a CTE below about 50 ppm. It should be noted that the bezel 18 may include combinations of low CTE polymers as well as combinations of low CTE polymers with regular CTE polymers. Additionally, the bezel 18 may include one or more fillers configured to further reduce the CTE of the bezel 18. Exemplary filler materials may include glasses, metals, minerals, organic materials or ceramics which may lower the overall CTE of the polymer. The filler materials may be in the form of powders, flakes, and fibers. The bezel 18 may have a volume fraction of filler material greater than about 10%, greater than about 20%, greater than about 30%, greater than about 40%, and greater than about 50%. In a specific example, the bezel 18 may be comprise nylon with an approximately 30% by volume glass filler. In some embodiments, the bezel 18 may have different local compositions of polymer or filler material in order to locally minimize the CTE of the bezel 18. For example, corners or long portions at the top and bottom of the bezel 18 may comprise a different polymer or higher volume fraction of filler material than other portions of the bezel 18. It should be understood that in embodiments of the rearview mirror assembly 10 not including a bezel 18, the housing 14 may alternatively comprise the afore mentioned materials described in connection with the bezel 18.

The difference in thermal expansion coefficient between the first and second substrates 26, 34 and at least one of the bezel 18 and the housing 14 may be between about 5 ppm and about 50 ppm, or between about 10 ppm and about 25 ppm, or between about 10 ppm and about 15 ppm. In a specific example, the difference in thermal expansion coefficient between the first and second substrates 26, 34 and at least one of the bezel 18 and the housing 14 may be about 13 ppm. Low difference in coefficient of thermal expansion between the first and second substrates 26, 34 and the bezel 18 and or housing 14 may be advantageous in that it may reduce the change in the thickness of the gap 62.

By tailoring the use of the reinforcement 90, low CTE polymers in the bezel 18, laser cutting of the first and second substrates 26, 34, and altering the flexibility of the electro-optic element 22, the line-to-line fit between the electro-optic element 22 and the bezel 18, and the small distances of the gap 62, may be achieved without risking fracture of the electro-optic element 22. In embodiments utilizing the reinforcement 90, the reinforcement 90 may act to restrain the expansion and contraction of the bezel 18 by carrying a portion of the tensile and compression forces generated during temperature change of the bezel 18. By carrying the force, the reinforcement 90 may prevent the bezel 18 from expanding or contracting as much as it may without the reinforcement. In embodiments utilizing low CTE polymers for the bezel 18, the low CTE may reduce the magnitude of size change experienced by the bezel 18, thereby allowing for a smaller gap 62 between the electro-optic element 22 and the bezel 18 without fear of generating hoop stresses in the electro-optic element 22. The use of the reinforcement 90, which has a low CTE, will enable the use of high CTE polymers as a finishing surface (e.g., the bezel first surface 18A) of the bezel 18. Molding with filled polymers, especially fiber filled polymers, may degrade the surface finish of the molded part. Higher quality surface finishes (e.g., of the bezel first surface 18A of the bezel 18) can generally be obtained with polymers with a lower volume fractions of filler materials. It will be understood that the filler 80 disposed in the gap 62 can be used in conjunction with low CTE polymer embodiments of the bezel 18 and/or embodiments of the bezel 18 incorporating the reinforcement 90.

Embodiments of the first and second substrates 26, 34 which are formed via laser cutting may have a sufficiently smooth edge 30 and second edge 36, respectively, so as to reduce or remove stress concentrators. Accordingly, if the bezel 18 were to make contact with the electro-optic element 22 as it contracted in low temperatures, the hoop stress would not localize at a point and result in fracture of the electro-optic element 22, but rather be distributed over the smooth edge 30 and second edge 36. Additionally, by utilizing thinner (e.g., between about 0.5 mm and about 1.0 mm) substrates 26, 34 and solution-phase electro-optic material 42 to create a relatively flexible electro-optic element 22, stress generated by contact between the bezel 18 and the electro-optic element 22 may partially be dissipated through flexing of the electro-optic element 22. It should be understood that in some embodiments, the rearview mirror assembly 10 may include some features (e.g., flexible electro-optic element 22 or laser cut first and second substrates 26, 34), but not include others (e.g., reinforcement 90 or solution-phase electro-optic material 42) while still achieving a line-to-line fit between the electro-optic element 22 and the bezel 18.

Referring now to FIGS. 3C-F, depicted are various configurations of the first substrate 26 which have been integrally molded with the bezel 18. Aesthetically, the most desirable gap 62 is no visible gap 62 or a distance D of less than about 25 microns. The bezel 18 can be molded to the first and/or second substrates 26, 34 as an integrated component if: the reinforcement 90 is incorporated into polymeric embodiments of the bezel 18, the bezel 18 is formed from a low CTE polymer, and/or if the polymeric embodiments of the bezel 18 are filled with a sufficient loading of a CTE reducing filler (e.g., glass fiber or carbon fiber). In integrally molded embodiments, the bezel 18 may be laminated directly to the first and/or second substrates 26, 34 or the bezel 18 may be injection molded around the first and/or second substrates 26, 34 such that the distance D of the gap 62 may be less than about 15 microns, less than about 10 microns, less than about 5 microns or even have no gap 62. An exemplary method of laminating the bezel 18 to the first or second substrates 26, 34 may be accomplished via a method similar to SURFIC™ as developed by Asahi Glass Co. LTD of Chiyoda, Tokyo, Japan. Use of SURFIC™ or the other integrated molding techniques described above would reduce the distance D of the gap 62 between the first substrate 26 and the bezel 18 to near zero and produce an aesthetically pleasing rearview mirror assembly 10.

The foregoing disclosure details a rearview mirror assembly construction having a housing, a bezel and an electro-optic element. The electro-optic mirror element has a first substantially transparent substrate with an edge extending around at least a portion of a perimeter of the first substantially transparent substrate. The rearview mirror assembly also has a second substantially transparent substrate. The first and second substantially transparent substrates define a cavity. An electro-optic material is disposed within the cavity. A gap is defined between the electro-optic mirror element and the bezel. A filler is disposed within the gap such that the filer is substantially flush with a first surface of the electro-optic mirror element and a first surface of the bezel.

This disclosure also details a rearview mirror assembly construction having a housing, a bezel and an electro-optic element. The electro-optic element has a first substantially transparent substrate with an edge extending around at least a portion of a perimeter of the first substantially transparent substrate. The rearview mirror assembly also has a second substantially transparent substrate. The first and second substantially transparent substrates define a cavity. An electro-optic material is disposed within the cavity. The edge of the first substantially transparent substrate and an edge of the bezel are coupled such that substantially no gap is defined between the edge of the first substantially transparent substrate and the edge of the bezel. The bezel and the first substantially transparent substrate are coupled such that the front surface of the glass is substantially flush with a front surface of the bezel.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview mirror assembly comprising:
a housing;
a bezel; and
an electro-optic mirror element comprising:
a first substantially transparent substrate having an edge extending around at least a portion of a perimeter of the first substantially transparent substrate;
a second substantially transparent substrate, wherein the first and second substantially transparent substrates define a cavity; and
an electro-optic material disposed within the cavity,
wherein the first substantially transparent substrate and at least one of the housing and bezel have a difference in coefficient of thermal expansion between about 5 ppm and about 50 ppm.

2. The rearview mirror assembly of claim 1, wherein the difference in coefficient of thermal expansion between the first substantially transparent substrate and at least one of the housing and bezel is between about 10 ppm and about 25 ppm.

3. The rearview mirror assembly of claim 2, wherein the difference in coefficient of thermal expansion between the first substantially transparent substrate and at least one of the housing and bezel is about 13 ppm.

4. The rearview mirror assembly of claim 3, wherein a gap is defined between the first substantially transparent substrate and the bezel, the gap having a width of less than or equal to about 25 μm over greater than about 75% of the edge.

5. The rearview mirror assembly of claim 1, wherein the bezel comprises a polymeric material which comprises a glass filler material.

6. The rearview mirror assembly of claim 1, further comprising:
a reinforcement positioned within the bezel, the reinforcement having a lower coefficient of thermal expansion than the polymeric material.

7. The rearview mirror assembly of claim 6, wherein the reinforcement comprises a metal.

8. A rearview mirror assembly comprising:
a housing;
a bezel; and
an electro-optic mirror element comprising:
a first substantially transparent substrate;
a second substantially transparent substrate, wherein the first and second substantially transparent substrates define a cavity; and
an electro-optic material disposed within the cavity,
wherein a gap is defined between the electro-optic element and the bezel, the gap having a width of less than about 25 μm around at least about 75% of the electro-optic element.

9. The rearview mirror assembly of claim 8, wherein at least one of the bezel and the housing comprises a polymeric material having a coefficient of thermal expansion less than about 50 ppm.

10. The rearview mirror assembly of claim 9, wherein the polymeric material comprises a glass filler material.

11. The rearview mirror assembly of claim 8, wherein the gap has a width of less than about 25 μm around at least about 90% of the electro-optic element.

12. The rearview mirror assembly of claim 11, wherein the gap has a width of less than about 25 μm around at least about 95% of the electro-optic element.

13. The rearview mirror assembly of claim 12, wherein a difference in coefficient of thermal expansion between the first substantially transparent substrate and the bezel is between about 10 ppm and about 25 ppm.

14. A rearview mirror assembly comprising:
a housing;
a bezel; and
an electro-optic element comprising:
a first substantially transparent substrate having an edge extending around at least a portion of a perimeter of the first substantially transparent substrate;
a second substantially transparent substrate, wherein the first and second substantially transparent substrates define a cavity; and
an electro-optic material disposed within the cavity,
wherein at least one of the bezel and the housing comprises a polymeric material having a coefficient of thermal expansion less than about 50 ppm.

15. The rearview mirror assembly of claim 14, wherein the polymeric material comprises a glass filler material.

16. The rearview mirror assembly of claim 15, wherein a gap is defined between the first substantially transparent substrate and the bezel, the gap having a width of less than or equal to about 25 μm over greater than about 75% of the edge.

17. The rearview mirror assembly of claim 16, wherein the gap has a width of less than or equal to about 25 μm over greater than about 90% of the edge.

18. The rearview mirror assembly of claim 17, wherein the first substantially transparent substrate and the bezel have a difference in coefficient of thermal expansion of between about 5 ppm and about 50 ppm.

19. The rearview mirror assembly of claim 18, wherein the first substantially transparent substrate and the bezel have a difference in coefficient of thermal expansion of between about 10 ppm and about 25 ppm.

20. The rearview mirror assembly claim 19, further comprising:
a metal reinforcement positioned within the bezel.

* * * * *